(12) United States Patent  
Yonezawa et al.

(10) Patent No.: US 6,675,843 B2
(45) Date of Patent: Jan. 13, 2004

(54) NON-RETURN VALVE FOR FUEL TANK

(75) Inventors: Kenji Yonezawa, Kanagawa-ken (JP); Hiroki Isobe, Kanagawa-ken (JP)

(73) Assignees: Piolax Inc., Kanagawa-ken (JP); Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 10/166,392

(22) Filed: Jun. 11, 2002

(65) Prior Publication Data

US 2002/0189711 A1 Dec. 19, 2002

(30) Foreign Application Priority Data

Jun. 19, 2001 (JP) ................................. P2001-184378

(51) Int. Cl.[7] ................................................ B65B 1/04
(52) U.S. Cl. ........................ 141/301; 137/592; 220/86.2
(58) Field of Search ........................... 141/301, 349, 141/350, 302, 285, 383; 220/86.2; 137/592, 515.5, 515; 285/346, 348, 354

(56) References Cited

U.S. PATENT DOCUMENTS

| 5,048,578 | A | * | 9/1991 | Dorf et al. | 141/346 |
|---|---|---|---|---|---|
| 5,282,497 | A | * | 2/1994 | Allison | 220/86.2 |
| 5,660,206 | A | * | 8/1997 | Neal et al. | 137/592 |
| 6,012,599 | A | * | 1/2000 | Miura et al. | 220/86.2 |
| 6,019,127 | A | * | 2/2000 | Orita et al. | 137/592 |
| 6,026,855 | A | * | 2/2000 | Jackson et al. | 137/592 |
| 6,056,029 | A | * | 5/2000 | Devall et al. | 141/301 |
| 6,240,957 | B1 | * | 6/2001 | Hattori | 137/592 |
| 6,340,031 | B1 | * | 1/2002 | Matsumoto et al. | 137/592 |
| 6,502,607 | B2 | * | 1/2003 | Brown et al. | 141/301 |

FOREIGN PATENT DOCUMENTS

| DE | 19912645 C1 | * | 10/2000 |
|---|---|---|---|
| JP | 7-9637 | | 2/1995 |

OTHER PUBLICATIONS

English Language Abstract for JP Appln. No. 7–9637.

* cited by examiner

Primary Examiner—Gregory Huson
Assistant Examiner—Khoa Huynh

(57) ABSTRACT

A non-return valve includes a main tube to be externally inserted into and joined to a fuel filling pipe, and a valve element to be provided on a downstream end of the main tube for allowing fuel to flow into a fuel tank and inhibiting a back flow out of the fuel tank. On an upstream side of the main tube, provided is a first inner tube including a first retaining portion relevant to the fuel filling pipe, an annular sealing member abutting on an inner periphery of the main tube and on an outer periphery of the fuel filling pipe, and a second inner pipe disposed more upstream than the first inner tube so as to sandwich the annular sealing member together with the first inner tube, the second inner tube including a second retaining portion relevant to the main tube.

9 Claims, 5 Drawing Sheets

NON-RETURN VALVE FOR FUEL TANK

BACKGROUND OF THE INVENTION

1. Field of the Invention

The present invention relates to a non-return valve for a fuel tank, which is provided on a downstream end of a fuel filling pipe of a fuel tank of an automobile or the like.

2. Description of the Related Art

As shown in FIG. 1, a variety of tubes including a fuel filling pipe 11 are connected to a fuel tank 10 of an automobile. Specifically, one end of the fuel filling pipe 11 is connected to an aperture on a body of an unillustrated automobile, and a lid 12 is provided thereon. The other end of the fuel filling pipe 11 is inserted into the fuel tank 10, and a non-return valve 13 is fitted on a tip thereof.

Note that reference numeral 14 in FIG. 1 denotes a fuel supply pipe for supplying fuel to an injector of an unillustrated engine. A leader 14a thereof is attached to a chamber 15 disposed in the fuel tank 10. Moreover, reference numeral 16 denotes a fuel return pipe for returning the fuel unconsumed in the engine back to the fuel tank 10. In addition, reference numeral 17 denotes a vapor drawing pipe for guiding fuel vapor evaporated inside the fuel tank 10 out to an unillustrated canister.

From time to time, the fuel inside the fuel tank 10 is evaporated and thereby constitutes a high pressure. If the lid 12 of the fuel filling pipe 11 is opened in such a state, there is a risk that the fuel inside the fuel tank 10 flows back and erupts out of the aperture. The non-return valve 13 is provided to prevent flowing-back of the fuel as described above.

As an example of such non-return valves, there is Japanese Utility Model Laid-open Publication No. 7 (1995)-9637. In this example, the non-return valve includes a tubular case to be inserted into an end portion of a fuel filling pipe, and a valve element to be fitted into an aperture at one end of the case for closing the aperture. The non-return valve is disclosed therein, which is provided with a concave portion on an outer periphery of the case, and a flexible piece formed on an upper concave portion to be fitted into an engaging hole of the fuel filling pipe when the case is inserted into the fuel filling pipe.

SUMMARY OF THE INVENTION

However, the non-return valve as disclosed in the above-mentioned Japanese Utility Model Laid-open Publication No. 7 (1995)-9637 cannot prevent fuel and vapor thereof from flowing back from the outside of the fuel filling pipe inside the fuel tank to the inside of the fuel filling pipe through a gap between the fuel filling pipe and the tubular case, more particularly, through a gap between the engaging hole of the fuel filling pipe and the flexible piece of the case. For this reason, just as a tap of a fuel intake is released in a state of increased pressure inside the fuel tank owing to a high temperature, for example, then fuel droplets and vapor thereof suddenly erupt out into the atmosphere in the next breath.

In consideration of the foregoing problem, an object of the present invention is to provide a non-return valve for a fuel tank capable of sealing a downstream end portion of a fuel filling pipe more hermetically.

To attain the foregoing object, a first aspect of the present invention is to provide a non-return valve provided on a downstream end of a fuel filling pipe of a fuel tank, which includes a main tube to be inserted into the fuel filling pipe, a valve element provided on a downstream portion of the main tube, the valve element allowing fuel to flow into the fuel tank and inhibiting a back flow from the fuel tank, a first tube disposed between the main tube and the fuel filling pipe, the first tube including a first retaining portion relevant to the fuel filling pipe, an annular sealing member abutting on a peripheral face of the main tube and a peripheral face of the fuel filling pipe, and a second tube disposed at a position more upstream than the first tube so as to sandwich the annular sealing member together with the first tube, the first tube including a second retaining portion relevant to the main tube. Here, the first retaining portion of the first tube is engaged with and joined to the fuel filling pipe when the fuel filling pipe is inserted into the main tube.

According to the first aspect of the present invention as described above, when the fuel filling pipe is inserted into the second pipe from an upstream end portion of the main tube, a tip of the fuel filling pipe proceeds into the main tube through the second tube, the annular sealing member and the first tube and is engaged with and joined to the first retaining portion of the first tube. Therefore, the non-return valve for a fuel tank can be fitted onto the downstream end portion of the fuel filling pipe by a single action. Moreover, the annular sealing member seal closely contacts with the peripheral face of the fuel filling pipe and the peripheral face of the main tube and thereby sealing the both members, and a downstream side below the annular sealing member is completely covered with the main tube. In this way, it is possible to prevent a back flow of fuel and vapor thereof into the fuel filling pipe in the state where the non-return valve is closed, and to prevent sudden eruption of the fuel droplets and the vapor thereof out to the atmosphere when a tap of a fuel intake is released.

A second aspect of the present invention is to provide a non-return valve provided on a downstream end of a fuel filling pipe of a fuel tank, which includes a main tube to be externally inserted into and joined to the fuel filling pipe, a valve element provided on a downstream portion of the main tube for allowing fuel to flow into the fuel tank and inhibiting a back flow from the fuel tank, a first inner tube disposed between the main tube and the fuel filling pipe, the first tube including a first retaining portion relevant to the fuel filling pipe, an annular sealing member abutting on an inner periphery of the main tube and an outer periphery of the fuel filling pipe, and a second inner tube disposed at a position more upstream than the first tube so as to sandwich the annular sealing member together with the first tube, the second inner tube including a second retaining portion relevant to the main tube. Here, the first retaining portion of the first inner tube is engaged with and joined to the fuel filling pipe when the fuel filling pipe is inserted into the main tube.

According to the second aspect of the present invention as described above, since the non-return valve has a structure to insert the maim tube externally into the fuel filling pipe, a flow path for the fuel is not narrowed. Note that the first inner tube of the second aspect corresponds to the first tube of the first aspect, and the second inner tube of the second aspect corresponds to the second tube of the first aspect.

Moreover, a third aspect of the present invention is to provide the non-return valve for a fuel tank according to the second aspect, in which the first retaining portion includes an elastic retention arm protruding toward an inner diameter of the first inner tube and extending toward an upstream side so as to sandwich the fuel filling pipe, and a claw provided on an end portion of the first retaining portion is engaged non-rotatably with an engaging hole on the fuel filling pipe and thereby supports the fuel filling pipe by sandwiching between the elastic retention arm and an inner surface of the first inner tube.

According to the third aspect of the present invention as described above, the retaining portion of the first inner tube is formed of the elastic retention arm which protrudes toward the inner diameter and then extends toward the upstream side so as to sandwich the fuel filling pipe. Therefore, it is possible to secure a flexure margin for the elastic retention arm inside a tube path, and to provide the retaining portion relevant to the fuel filling pipe without affecting airtightness of the main tube.

In addition to the third aspect, a fourth aspect of the present invention is to provide the non-return valve for a fuel tank, which further includes rotation controlling means for controlling rotation of the main tube relative to the first inner tube, and depth controlling means for controlling a depth of insertion of the second inner tube with respect to the main tube.

According to the fourth aspect of the present invention as described above, the depth controlling means is provided in addition to the third aspect between the main tube and the second inner tube. Therefore, it is possible not to apply excessive pressure on the annular sealing member while securing an appropriate space between the first inner tube and the second inner tube. Moreover, the rotation controlling means between the main tube and the first inner tube can effectuate insertion of the first inner tube into the main tube at a proper angle with respect to the main tube.

DESCRIPTION OF THE PREFERRED EMBODIMENT

Figure 1:
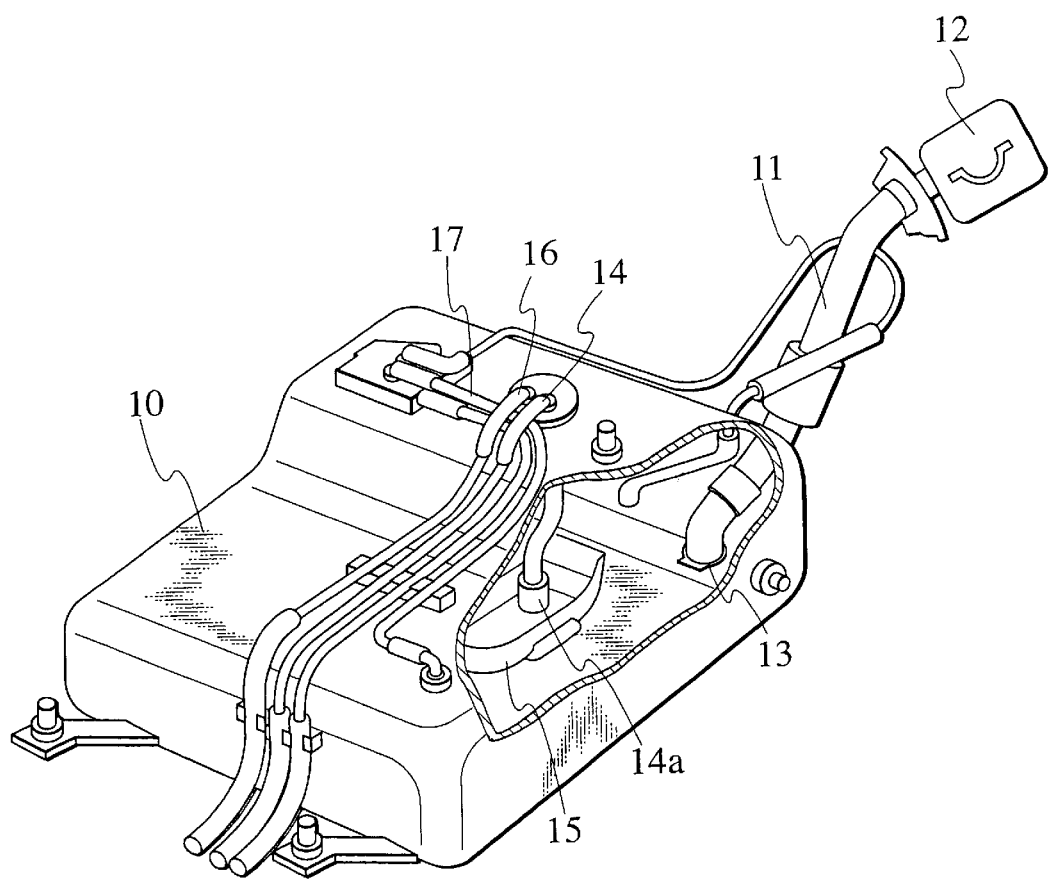
FIG. 1 is an explanatory view for showing a structure of a fuel tank.
Figure 2:
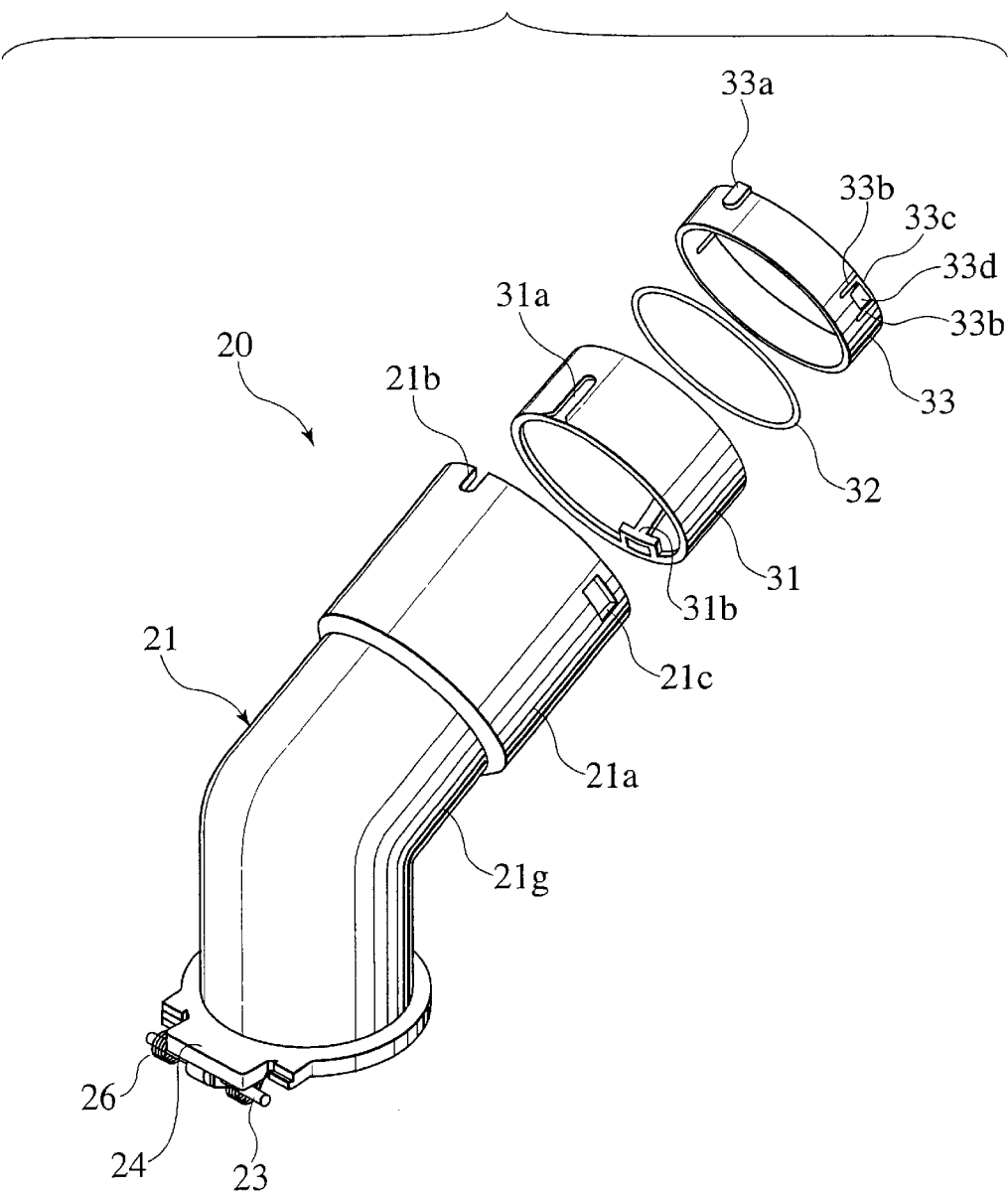
FIG. 2 is an exploded perspective view showing one embodiment of a non-return valve for a fuel tank according to the present invention.
Figure 3:
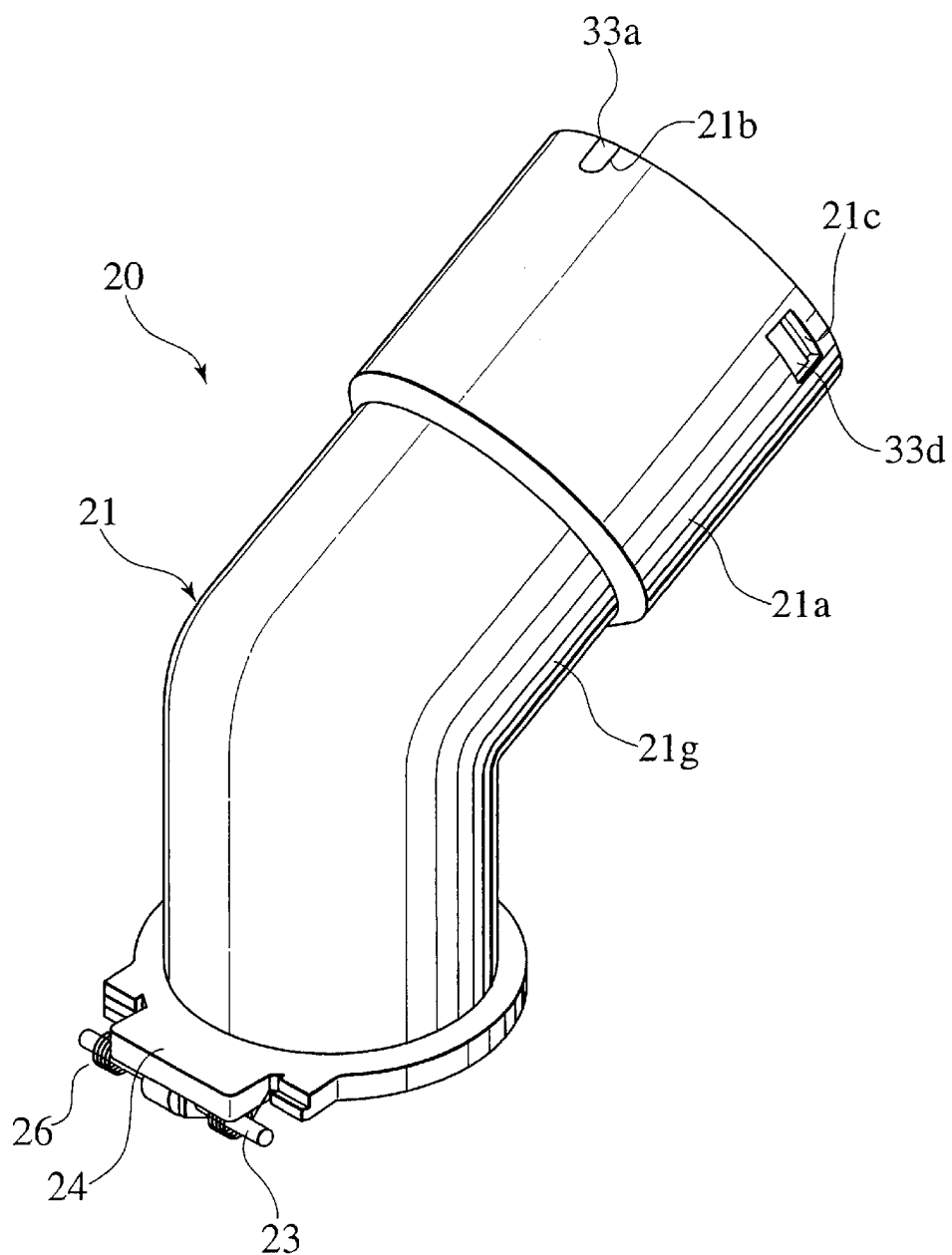
FIG. 3 is a perspective view of the non-return valve.
Figure 4:
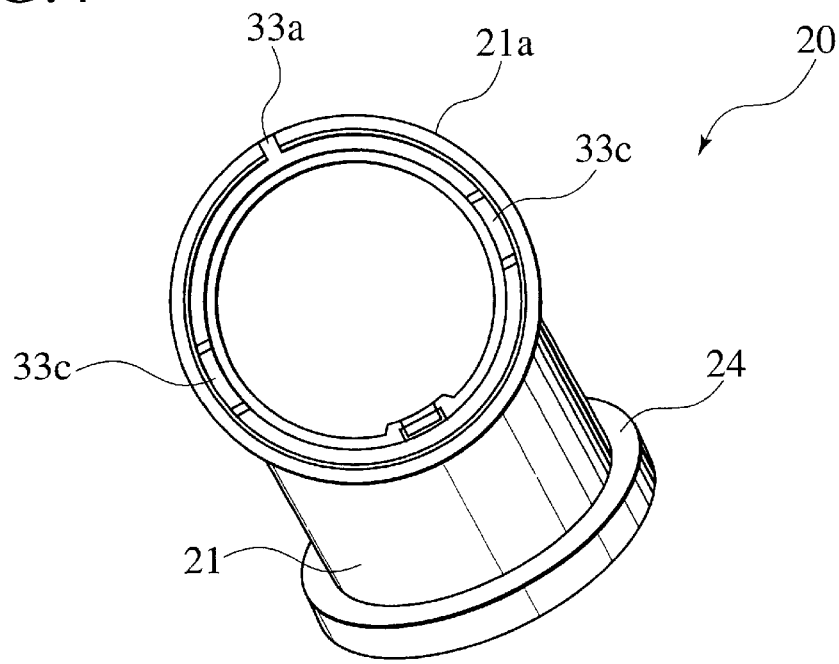
FIG. 4 is an end view of the non-return valve viewed from an upstream aperture thereof.
Figure 5:
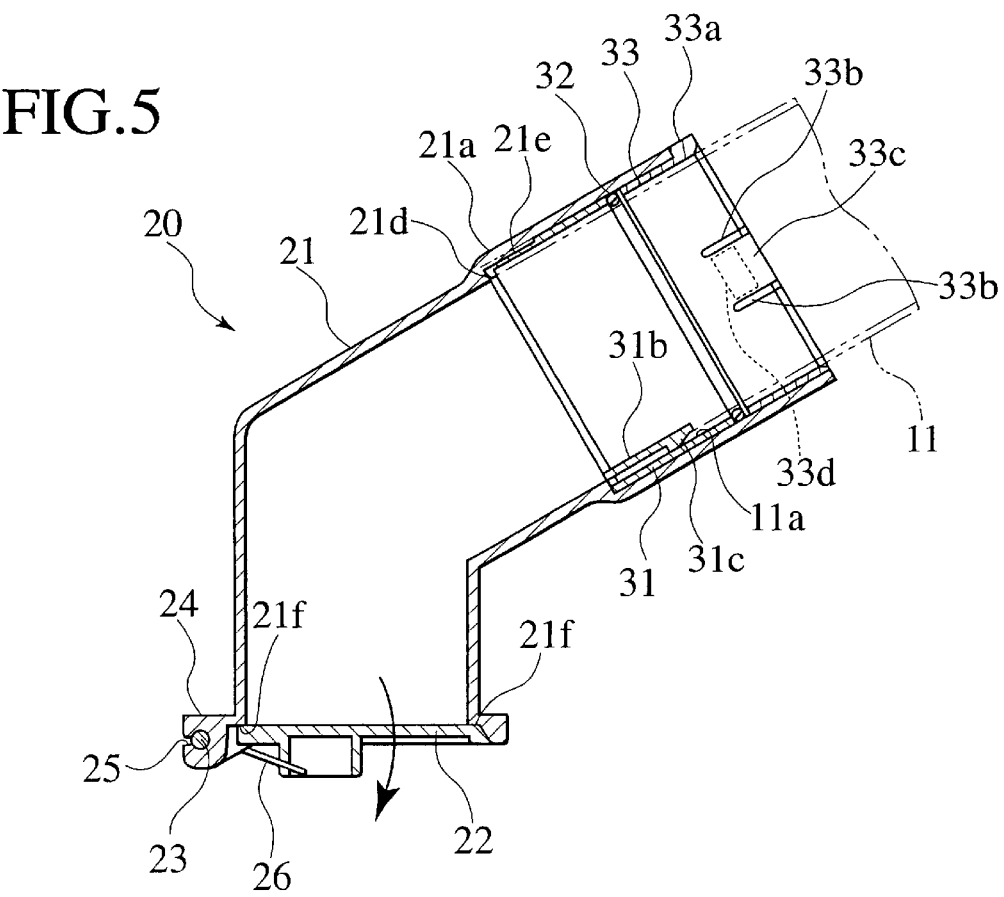
FIG. 5 is a cross-sectional view of the non-return valve.
Figure 6:
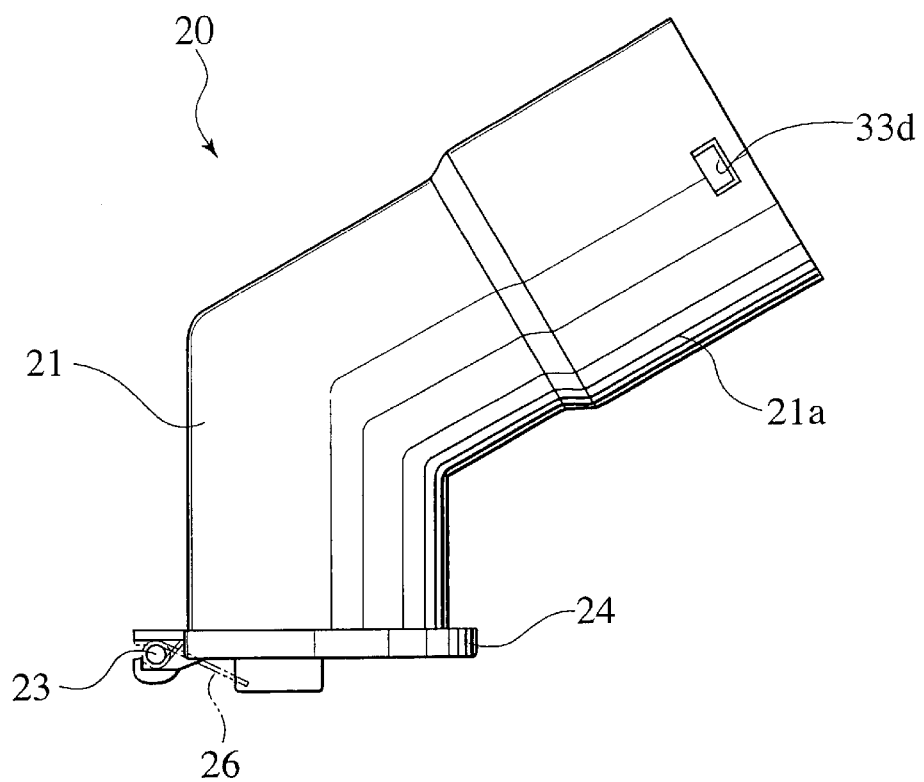
FIG. 6 is a side view of the non-return valve.
Figure 7:
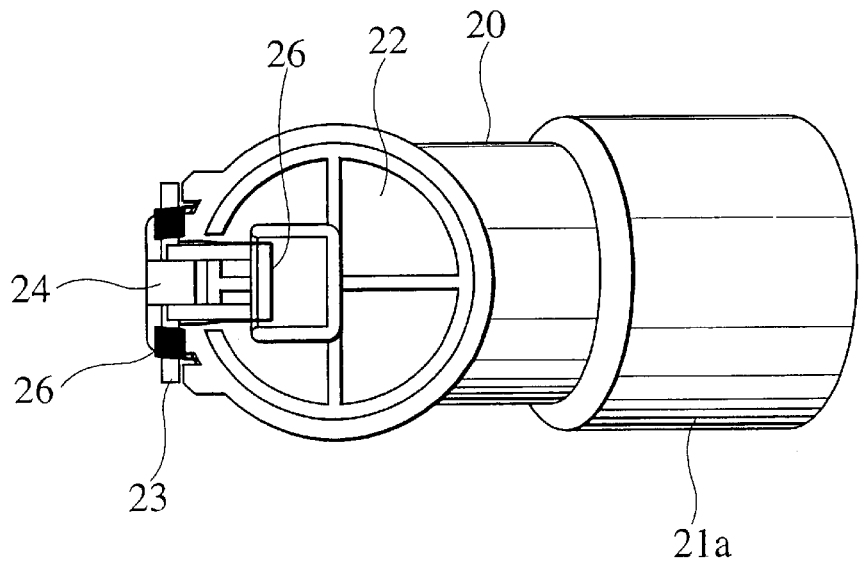
FIG. 7 is a bottom view of the non-return valve.

One embodiment of a non-return valve for a fuel tank according to the present invention is illustrated in FIGS. 2 to 7. FIG. 2 is an exploded perspective view of the non-return valve; FIG. 3 is a perspective view of the non-return valve; FIG. 4 is an end view of the non-return valve viewed from an upstream aperture thereof; FIG. 5 is a cross-sectional view of the non-return valve; FIG. 6 is a side view of the non-return valve; and FIG. 7 is a bottom view of the non-return valve.

The non-return valve 20 includes an elbow-shaped main tube 21 having an angle of approximately 60 degrees. A fuel filling pipe 11 is inserted into and fixed to an upstream end portion of the main tube 21 from a viewpoint of a flowing direction of fuel. A valve element 22 is fitted on a downstream end portion of the main tube 21. The upstream end portion of the main tube 21 extends diagonally upward; meanwhile, the downstream end portion of the main tube 21 extends in a drooping manner.

The valve element 22 is fitted to the downstream end portion of the main tube 21 as openable and closable via a shaft 23 which is fitted on one end of the valve element 22. Specifically, a bearing 25 of a C-shaped cross section is formed on a flange 24 that is formed on the downstream end portion of the main tube 21. The valve element 22 is fitted rotatably in a manner that the shaft 23 is fitted into the bearing 25. When the valve element 22 is closed, the valve element 22 closely contacts with an inner periphery of the downstream end portion of the main tube 21, thus clogging an aperture of the end portion hermetically.

Moreover, a torsion spring 26 is placed on the shaft 23. The torsion spring always applies a force to the valve element 22 in a direction of closing the aperture of the downstream end portion of the main tube 21. The torsion spring 26 is designed to have a spring force so as to open the valve element 22 by pressure upon filling the fuel into the fuel tank and to apply the force to the valve body 22 to close the downstream end portion of the main tube 21 on other occasions.

The upstream end portion of the main tube 21 constitutes a wide-diameter portion 21a. A first inner tube 31, an O ring 32 as an annular sealing member, and a second inner tube 33 are inserted into an inner periphery of the wide-diameter portion 21a. The first inner tube 31 corresponds to a first tube in the present invention and the second inner tube 33 corresponds to a second tube therein. Moreover, a U-shaped notch 21b and an engaging hole 21c are formed on an open end portion of the wide-diameter portion 21a. Meanwhile, a narrow-diameter portion 21g connecting to the wide-diameter portion 21a has a smaller diameter than the wide-diameter portion 21a. At the back of the inner periphery of the wide-diameter portion 21a, provided is a step portion 21d which abuts on an edge of the narrow-diameter portion 21g. A bar protrusion 21e is formed so as to extend from one position of the step portion 21d toward the aperture in the axial direction by a predetermined length.

The first inner tube 31 includes an outside diameter which contacts closely with the inner periphery of the wide-diameter portion 21a of the main tube 21. On an outer periphery of the first inner tube 31, formed is a bar groove 31a which extends by a predetermined length in the axial direction from the downstream end portion toward the upstream side thereof. Therefore, when the first inner tube 31 is inserted into the wide-diameter portion 21a of the main tube 21, the bar protrusion 21e is fitted into the bar groove 31a, whereby rotation is controlled. In other words, the bar protrusion 21e and the bar groove 31a collectively constitute rotation controlling means in the present invention.

In the meantime, an elastic retention arm 31b is provided on an inner periphery of the first inner tube 31 in a manner that the elastic retention arm 31b protrudes from the downstream end portion toward an inside diameter and extends along the axial direction toward the upstream side. On a tip of the elastic retention arm 31b, formed is a claw 31c which protrudes toward the outside diameter. The claw 31c is engaged with an engaging hole 11a on the fuel filling pipe 11.

The O ring 32 constitutes the annular sealing member in the present invention, which is made of rubber or elastomer thicker than wall thicknesses of the first inner tube 31 and the second inner tube 33. When the fuel filling pipe 11 is inserted into the main tube 21, the O ring 32 is sandwiched and pressed by an outer periphery of the fuel filling pipe 11 and the inner periphery of the main tube 21, thus functioning as sealing a gap between the both members.

The second inner tube 33 includes a bar protrusion 33a on an outer periphery thereof, which extends by a predetermined length from an upstream end portion in the axial direction. The bar protrusion 33a is fitted into the notch 21b of the main tube 21, thus controlling a depth of insertion of the second inner tube 33. In other words, the bar protrusion 33a and the notch 21b collectively constitute insertion depth controlling means in the present invention.

Moreover, on the second inner tube 33, formed is an elastic engaging piece 33c by a pair of slits 33b formed parallel to the axial direction from the upstream end portion. On a tip of the elastic engaging piece 33c, formed is a claw 33d which protrudes toward a direction of an outside diameter of the second inner tube 33. The claw 33d is fitted into the engaging hole 21c of the main tube 21, thus holding the first inner tube 31, the O ring 32 and the second inner tube 33 not to come off.

Next, description will be made regarding an operation of the non-return valve 20 for a fuel tank.

First, the first inner tube 31 is inserted into the wide-diameter portion 21a of the main tube 21. In this event, the first inner tube 31 can be inserted only if the bar groove 31a of the first inner tube 31 is positioned so as to allow insertion of the bar protrusion 21e of the main tube 21. In other words, positioning of the first inner tube 31 relevant to the main tube 21 is performed accurately by the bar protrusion 21e and the bar groove 31a, and rotation of the first inner tube 31 relative to the main tube 21 after insertion is thereby controlled.

Subsequently, the O ring 32 is inserted into the main tube 21, and further, the second inner tube 33 is inserted into the main tube 21. In this event, the second inner tube 33 cannot be inserted if the bar protrusion 33a thereof is not positioned to be inserted into the notch 21b of the main tube 21. Accordingly, rotation of the second inner tube 33 relative to the main tube 21 is thereby controlled. Thereafter, when the second inner tube 33 is inserted in a manner that the bar protrusion 33a moves along the notch 21b, then the claw 33d of the elastic engaging piece 33c of the second inner tube 33 is fitted into the engaging hole 21c of the main tube 21 to avoid coming off; simultaneously, the first inner tube 21 and the O ring 32 are held inside the main tube 21 as well.

As s result, the O ring 32 is sandwiched by an edge face of the first inner tube 31 and an edge face of the second inner tube 33, whereby movement in the axial direction is controlled. Nevertheless, as a depth of pushing the second inner tube 33 is controlled by insertion of the bar protrusion 33a into the notch 21b, the O ring 32 is not pressed excessively but a proper gap is retained for maintaining elasticity.

When the non-return valve 20 thus assembled is fitted onto the fuel filling pipe 11, the fuel filling pipe 11 is inserted into the wide-diameter portion 21a of the main tube 21 of the non-return valve 20. Then, the fuel filling pipe 11 passes through the second inner tube 33, the O ring 32 and the inner periphery of the first inner tube 31 and is pushed thereinto until a tip thereof abuts on the step portion 21d. Thereafter, the claw 31c of the elastic retention arm 31b of the first inner tube 31 is fitted into the engaging hole 11a previously formed on the fuel filling pipe 11, whereby the non-return valve 20 is fitted to the fuel filling pipe 11 to avoid coming off.

Then, the fuel filling pipe 11 with the non-return valve 20 for a fuel tank fitted thereon is inserted into and fixed to the fuel tank. Alternatively, it is also practicable that the fuel filling pipe 11 is inserted into and fixed to the fuel tank in advance, and then the non-return valve 20 is fitted on the tip of the fuel filling pipe 11 thereafter.

Regarding the fuel filling pipe 11 equipped with the non-return valve 20 as described above, when an unillustrated lid at the upstream end portion is opened and the fuel is poured in, the valve element 22 remains closed by the spring force of the torsion spring 26 and touches step portions 21f of the main tube 21, even if the inside of the fuel tank has a high pressure and the valve element 22 contacts with step portions 21f of the main tube 21. Accordingly, the fuel does not erupt out of a fuel intake. In the meantime, when the fuel is filled in, the valve element 22 is turned against the force applied by the torsion spring 26, whereby the downstream end portion of the main tube 21 is opened. Accordingly, the fuel is filled into the fuel tank smoothly. In other words, the valve element 22 can be turned to only one direction (the direction as illustrated with an arrow in FIG. 5).

Furthermore, if the fuel inside the fuel tank is evaporated and created a high pressure with the lid of the fuel filling pipe 11 closed, the downstream aperture of the main tube 21 is closed by the valve element 22 and a portion of connection between the main tube 21 and the fuel filling pipe 11 is sealed with the O ring 32. Accordingly, there is no risk of leakage of fuel vapor through the non-return valve 20 and the fuel filling pipe, or a back flow of the fuel.

It should be noted that the present invention can be also embodied as a structure in which the main tube 21 is inserted into an inner periphery of the fuel filling pipe 11. In that case, the present invention will be satisfactorily achieved by providing a first tube having a first retaining portion relevant to a fuel filling pipe, an annular sealing member to abut on a peripheral face of a main tube and on a peripheral face of the fuel filling pipe, and a second tube having a second retaining portion, which is disposed more upstream than the first tube so as to sandwich the annular sealing member together with the first tube.

What is claimed is:

1. A non-return valve provided on a downstream end of a fuel filling pipe of a fuel tank, the non-return valve comprising:

a main tube to be inserted into the fuel filling pipe;

a valve element provided on a downstream portion of the main tube for allowing fuel to flow into the fuel tank and inhibiting a back flow from the fuel tank;

a first tube disposed between the main tube and the fuel filling pipe, the first tube including a first retaining portion relevant to the fuel filling pipe;

an annular sealing member abutting on a peripheral face of the main tube and a peripheral face of the fuel filling pipe; and a second tube disposed at a position more upstream than the first tube so as to sandwich the annular sealing member together with the first tube, the second tube including a second retaining portion relevant to the main tube, wherein the first retaining portion of the first tube is engaged with and joined to the fuel filling pipe when the fuel filling pipe is inserted into the main tube.

2. A non-return valve provided on a downstream end of a fuel filling pipe of a fuel tank, the non-return valve comprising:

a main tube to be externally inserted into and joined to the fuel filling pipe;

a valve element provided on a downstream portion of the main tube for allowing fuel to flow into the fuel tank and inhibiting a back flow from the fuel tank;

a first inner tube disposed between the main tube and the fuel filling pipe, the first tube including a first retaining portion relevant to the fuel filling pipe;

an annular sealing member abutting on an inner periphery of the main tube and an outer periphery of the fuel filling pipe; and a second inner tube disposed at a position more upstream than the first tube so as to sandwich the annular sealing member together with the first tube, the second inner tube including a second retaining portion relevant to the main tube, wherein the first retaining portion of the first inner tube is engaged with and joined to the fuel filling pipe when the fuel filling pipe is inserted into the main tube.

3. The non-return valve for a fuel tank according to claim 2, wherein the first retaining portion includes:
an elastic retention arm protruding toward an inner diameter of the first inner tube and extending toward an upstream side; and
a claw provided on an end portion of the first retaining portion, and
wherein the claw is engaged non-rotatably with an engaging hole on the fuel filling pipe, and
the fuel filling pipe is sandwiched and fixed between the elastic retention arm and a surface of the first inner tube.

4. The non-return valve for a fuel tank according to claim 2, the non-return valve further comprising:
rotation controlling means for controlling rotation of the main tube relative to the first inner tube; and
depth controlling means for controlling a depth of insertion of the second inner tube with respect to the main tube.

5. The non-return valve for a fuel tank according to claim 4, wherein the rotation controlling means includes:
a bar groove provided on an outer periphery outside of the first inner tube from a downstream end thereof toward an upstream direction; and
a bar protrusion to be fitted into the bar groove, the bar protrusion being provided on an inner surface of the main tube.

6. The non-return valve for a fuel tank according to claim 4, wherein the depth controlling means includes:
a bar protrusion provided from an upstream end of the second inner tube toward a downstream direction; and
a notch to be fitted into the bar protrusion, the notch being provided from an upstream edge face of the main tube toward a downstream direction.

7. The non-return valve for a fuel tank according to claim 2, wherein the valve element is fitted on the downstream portion of the main tube with a torsion spring provided on the downstream end of the main tube and the valve element abuts on an abutting step portion provided on an inner downstream end of the main tube, whereby the valve element is fitted as turnable to only one direction.

8. The non-return valve for a fuel tank according to claim 2, wherein the main tube includes:
a narrow-diameter portion on which the valve element is provided; and
a wide-diameter portion having a greater radius than a radius of the narrow-diameter portion, and
wherein the fuel filling pipe abuts on a step portion in a position where the narrow-diameter portion and the wide-diameter portion are joined together.

9. The non-return valve for a fuel tank according to claim 2, wherein the second retaining portion is an elastic engaging piece formed by a pair of slits formed parallel to an axial direction of the second inner tube from an upstream end portion of the second inner tube, and
a claw provided on a tip of the elastic engaging piece is engaged with an engaging hole of the main tube.

* * * * *